United States Patent
Hornung et al.

[11] Patent Number: 5,982,123
[45] Date of Patent: Nov. 9, 1999

[54] INTERVAL CONTROL SYSTEM FOR INTERMITTENT WINDSHIELD WIPER

[75] Inventors: Siegfried Hornung, Getzinger, Germany; Dieter Dorsch, Ebnat-Koppel, Switzerland; Jurgen Dorsch, Ebnat-Kappel, Switzerland

[73] Assignee: Sidler, Inc., Madison Heights, Mich.

[21] Appl. No.: 08/929,038

[22] Filed: Sep. 15, 1997

[51] Int. Cl.⁶ ...................................................... H02P 1/04

[52] U.S. Cl. .................................. 318/443; 318/DIG. 2; 318/266

[58] Field of Search .................................. 318/444, 443, 318/DIG. 2; 15/250.1

[56] References Cited

U.S. PATENT DOCUMENTS

| | | | |
|---|---|---|---|
| 4,499,410 | 2/1985 | Iacoponi et al. | 318/444 |
| 5,015,931 | 5/1991 | Muller | 318/483 |
| 5,105,129 | 4/1992 | Shimizu et al. | 318/226 |
| 5,119,002 | 6/1992 | Kato et al. | 318/444 |

Primary Examiner—William M. Shoop, Jr.
Assistant Examiner—Rita Leykin
Attorney, Agent, or Firm—Rohm & Monsanto, P.L.C.

[57] ABSTRACT

An automatic, self-adaptive controller for varying the interval between wipes of a windshield wiper arrangement for a vehicle measures current drawn by the windshield wiper arrangement during a forward and return portions of the windshield wiper wipe cycle and calculates an integration of the current over each portion of the windshield wiper wipe cycle to establish forward portion and return portion integration. The magnitude of the portions, which graphically appear as current lobes over time, are indicative of wiper-to-windscreen friction, and hence, wetness. The difference between the forward and return integration is representative of vehicle air speed. The windshield is characterized as wet when the first and second summation values are small, and in that case, a short interval between wipes is established. When the first and second integration values are large, the windshield is deemed to be dry, and a long interval is established between wipes. The windshield wiper system may automatically be turned off when the weather is determined to be dry. When the air speed value is small, the computed interval is not changed. However, when the air speed value is large, the interval is reduced in duration. The invention contemplates the development of parameters for specific vehicle types and models whereby a cost saving is achieved by using the same control system.

38 Claims, 5 Drawing Sheets

FIG. 4
DRY, 0 km/h

FIG. 5
WET, 0 km/h

FIG. 6
DRY, 100 km/h

FIG. 7
WET, 100 km/h

INTERVAL CONTROL SYSTEM FOR INTERMITTENT WINDSHIELD WIPER

BACKGROUND OF THE INVENTION

1. Field of the Invention

This invention relates generally to systems for controlling windshield wipers for vehicles, and more particularly, to a system that can be adapted to the mechanical characteristics of specific vehicle models for controlling the duration of an interval between successive wipes of a windshield wiper in response to certain environmental conditions and which is self-adaptive in response to information inputted by the vehicle operator.

2. Description of the Related Arts

Conventional windshield wiper arrangements for motor vehicles generally are operable in the states of low on, high on, and intermittent. In many vehicles, the intermittent setting is adjustable whereby the duration between successive wipes can be made shorter or longer, in response to operator actuation of a control element, which may have a linear or rotary actuation characteristic. Even if a digital arrangement were to be provided, the wiping interval would remain fixed as predetermined by the operator, until a further actuation of the control element.

This known system of controlling the operation of a windshield wiper arrangement does not vary the duration of the wiping interval in response to environmental conditions or vehicle speed. Moreover, the known system does not vary the wiping interval even in response to operator control, such as when the predetermined interval is long and the operator initiates a wipe by actuating a wipe switch during such interval.

There is a need for a system that adapts the wiper interval during intermittent mode of operation in response to environmental conditions, such as the amount of rain falling on a windshield, and the speed of the vehicle. There is additionally a need to achieve the adaptive functionality at low cost and with simplicity. Specifically, without additional sensors, such as a rain sensor, a vehicle air-speed sensor, or a coupling to the vehicle's speedometer.

In addition to the foregoing, it is to be understood that conventional windshield wiper control arrangements of the type mentioned hereinabove do not require any adaptation to the specific vehicle in which they are installed in order to achieve the variability of the wipe interval because of the predetermination of the duration of the interval, illustratively by the operator. However, in an arrangement that would respond to environmental conditions, and which does not employ any sensor to identify or quantify the particular environmental condition, there would be a need to distinguish between the effects that result from the environmental condition and the characteristics of the particular vehicle. There is a need, therefore, for a windshield wiper interval control system that is readily adaptable to the characteristics of specific vehicle types or models.

It is, therefore, an object of this invention to provide a control system that varies the duration of the interval between successive wipes of a windshield wiper in response to environmental conditions.

It is another object of this invention to provide a windshield wiper control system that adapts the duration of the interval between successive wipes of a windshield wiper in response to the quantity of rain striking the windshield.

It is a further object of this invention to provide a windshield wiper control system that adapts the duration of the interval between successive wipes of a windshield wiper in response to the quantity of rain striking the windshield and without the use of a rain sensor.

It is also an object of this invention to provide a windshield wiper control system that adapts the duration of the interval between successive wipes of a windshield wiper in response to the speed of the vehicle.

It is additionally an object of this invention to provide a windshield wiper control system that adapts the duration of the interval between successive wipes of a windshield wiper in response to the speed of the vehicle and without the need for a vehicle speed sensor.

It is yet a further object of this invention to provide a windshield wiper control system that adapts the duration of the interval between successive wipes of a windshield wiper in response to the speed of the vehicle and without the need for any coupling to, or information from, the vehicle's speedometer.

It is also another object of this invention to provide a windshield wiper control system that adapts the duration of the interval between successive wipes of a windshield wiper in response to the quantity of water present on the windshield, and in response to data derived from the actions of the operator of the vehicle.

SUMMARY OF THE INVENTION

The foregoing and other objects are achieved by this invention which provides, in accordance with a first method aspect of the invention, a method of controlling the interval between wipes of a windshield wiper arrangement for a vehicle. In accordance with the invention, a windshield wiper wipe cycle is initiated;

the current drawn by the windshield wiper arrangement during a first predetermined portion of the windshield wiper wipe cycle is measured;

a first integration value of the current over the first predetermined portion of the windshield wiper wipe cycle is first calculated; and the interval between wipes in response to the first integration value is computed.

In a specific illustrative embodiment of this method aspect of the invention, there are further provided the steps of second calculating a second integration value of the current over a second predetermined portion of the windshield wiper wipe cycle, and of computing the interval between wipes is responsive to the first and second integration values. The first predetermined portion of the windshield wiper wipe cycle corresponds to a first interval of time during which the windshield wiper arrangement is operating in a forward wipe direction, and the second predetermined portion of the windshield wiper wipe cycle corresponds to a second interval of time during which the windshield wiper arrangement is operating in a return wipe direction.

In a further embodiment, there is provided the step of characterizing the windshield as wet when the first and second integration values are small. In this case, a short interval between wipes is established. When the first and second integration values are large, the windshield is deemed to be dry. In this case, a long interval is established between wipes, and in certain embodiments, the windshield wiper system is turned off.

In a further embodiment of the invention, there is provided the further step of computing an air speed value of the vehicle during the windshield wiper wipe cycle in response to the first and second integration values of the current. The air speed value of the vehicle during the windshield wiper wipe cycle is responsive to a difference between the first and second integration values of the current. When the air speed value is small, the interval established in the step of computing the interval is not changed. However, when the air speed value is large, the interval established in the step of computing the interval is reduced in duration.

In a preferred embodiment of this first method aspect of the invention, there is further provided the step of first normalizing an overall integration value corresponding to the sum of the first and second integration values whereby the wetness of the windshield is established to be in one of a plurality of predetermined wetness states. Such predetermined wetness states may be characterized, for example, as wet, moist, and dry, respectively.

In a highly advantageous embodiment of the invention, the system of the present invention is optimized for a particular vehicle or vehicle type or model. This is effected by the step of second normalizing the overall summation value in response to parameters that are characteristic to a predetermined vehicle type.

In accordance with a further method aspect of the invention, there is provided a method of controlling the interval between wipes of a windshield wiper arrangement for a vehicle. In this further method aspect of the invention:

a windshield wiper wipe cycle is initiated;

a current drawn by the windshield wiper arrangement during a first predetermined portion of the windshield wiper wipe cycle corresponding to a forward direction of operation of the windshield wiper wipe cycle is first measured;

a current drawn by the windshield wiper arrangement during a second predetermined portion of the windshield wiper wipe cycle corresponding to a return direction of operation of the windshield wiper wipe cycle is second measured;

a first integration value of the current over the first predetermined portion of the windshield wiper wipe cycle is first calculated;

a second integration value of the current over the second predetermined portion of the windshield wiper wipe cycle is second calculated; and a variation to an interval between wipes in response to a difference between the first and second integration values is computed.

In one embodiment of this further method aspect of the invention, prior to performing the step of computing the variation to the interval between wipes there is provided the further step of computing an overall integration value for the windshield wiper wipe cycle, the overall summation value being responsive to the first and second integration values. The interval between wipes is then computed in response to the overall integration value.

A difference value that corresponds to the difference between the first and second integration values is responsive to an air speed of the vehicle. The step of computing a variation to an interval between wipes comprises the further step of reducing the interval between wipes for large values of difference between the first and second integration values. That is, as vehicle speed is increased, the rate of wiper operation is increased. At low vehicle speeds, the step of computing a variation to an interval between wipes includes the further step of maintaining unchanged the interval between wipes. Such is the case for small values of difference between the first and second integration values.

Also in this further method aspect of the invention, there is provided the step of first normalizing the overall integration value corresponding to the sum of the first and second integration values whereby the wetness of the windshield is established to be in one of a plurality of predetermined wetness states. As previously noted, such predetermined wetness states correspond to the states of wet, moist, and dry, respectively. In a highly advantageous embodiment, there is provided the further step of second normalizing the overall integration value in response to parameters that are characteristic to a predetermined vehicle type. Thus, the range of operation of the windshield wiper arrangement is optimized for a particular vehicle type. In practice, the interval between wipes ranges in duration from 0 to about 30 seconds, and preferably to about 20 seconds.

In a still further embodiment, there is provided the further step of first normalizing an overall integration value corresponding to the sum of the first and second summation values. Data is collected empirically for formulating parameters corresponding to predetermined characteristics of the vehicle. In a specific illustrative embodiment of the invention, there is further provided the step of second normalizing the overall integration value in response to the parameters, the parameters being, as indicated, characteristic to a predetermined vehicle type. The data is collected and stored in a data storage arrangement of a computer in a specific embodiment, the computer is configured to assemble the data in a spreadsheet format.

In accordance with a system aspect of the invention, there is provided a system for controlling the interval between wipes of a windshield wiper arrangement for a vehicle. In accordance with the invention, the system is provided with a signal processor having an input for receiving a wiper motor current signal containing information relative to the quantity of current drawn by the windshield wiper arrangement, and an output for providing a digital wiper signal responsive to the wiper motor current signal. There is additionally provided a processor for computing in response to the digital wiper signal a integration value corresponding to a integration over time of the current drawn by the windshield wiper arrangement during consecutive forward and return cycles thereof and for computing a windshield wiper wipe cycle interval responsive to the integration value. The processor has an output for producing a wipe cycle initiation signal responsive to the computed windshield wiper wipe cycle interval.

In one embodiment, there is further provided a program memory for storing data in accordance with this aspect of the invention, initiating a windshield wiper wipe cycle is initiated;

data corresponding to a current drawn by the windshield wiper arrangement during a forward direction of the windshield wiper wipe cycle is first received by the program memory;

data corresponding to a current drawn by the windshield wiper arrangement during a second predetermined portion of the windshield wiper wipe cycle during a return direction of the windshield wiper wipe cycle is second received by the program memory;

a first integration value of the current over the first predetermined portion of the windshield wiper wipe cycle is first calculated; and a second integration value of the current over the second predetermined portion of the windshield wiper wipe cycle is second calculated.

In a specific illustrative embodiment of the invention of this system aspect of the invention, the processor is further provided with a facility for computing a variation to an interval between wipes in response to a difference between the first and second integration values. A parameter memory stores data corresponding to a characteristic of a particular vehicle type. Also, there is provided an input for receiving the data corresponding to a characteristic of the particular vehicle type and computing a variation to an interval between wipes in response to a difference between the first and second integration values.

An external computer is used for communicating with the processor for establishing the data corresponding to a characteristic of a particular vehicle type. There is further provided an operator actuatable input arrangement for effecting the communication between the processor and the external computer. The external computer is useful for defining parameter names that then are stored in the parameter memory.

In a highly advantageous embodiment of the invention, there is provided a driver actuatable element whereby the driver is enabled to initiate a windshield wiper wipe cycle. Such actuation on the part of the vehicle driver is accepted by the system of the present invention as an indication that the wipe cycle interval in effect at the time the driver initiated the windshield wiper wipe cycle is longer than desired by the driver, and is used to shorten the wipe cycle interval, i.e., increase the wipe cycle frequency. In some embodiments of the invention, the resulting shortened wipe cycle has a duration corresponding to the average of the existing wipe cycle interval and the interval between the immediately previous wipe cycle and the time the driver initiated the windshield wiper wipe cycle. In addition, the present invention can be configured to effect, or not to effect, a variation in the duration of the windshield wiper wipe cycle interval in response to the operation of the windshield washer by the vehicle operator.

In embodiments of the invention where a remote windshield wiper is employed, such as a rear window wiper, wiping interval data obtained from the principal, or front, windshield wiper arrangement can be used to control the interval of the rear wiper. For example, the rear wiper can be activated at predetermined multiples of the front wipers, illustratively every third wipe of the front wipers.

BRIEF DESCRIPTION OF THE DRAWINGS

Comprehension of the invention is facilitated by reading the following detailed description, in conjunction with the annexed drawing, in which.

DETAILED DESCRIPTION

Figure 1:
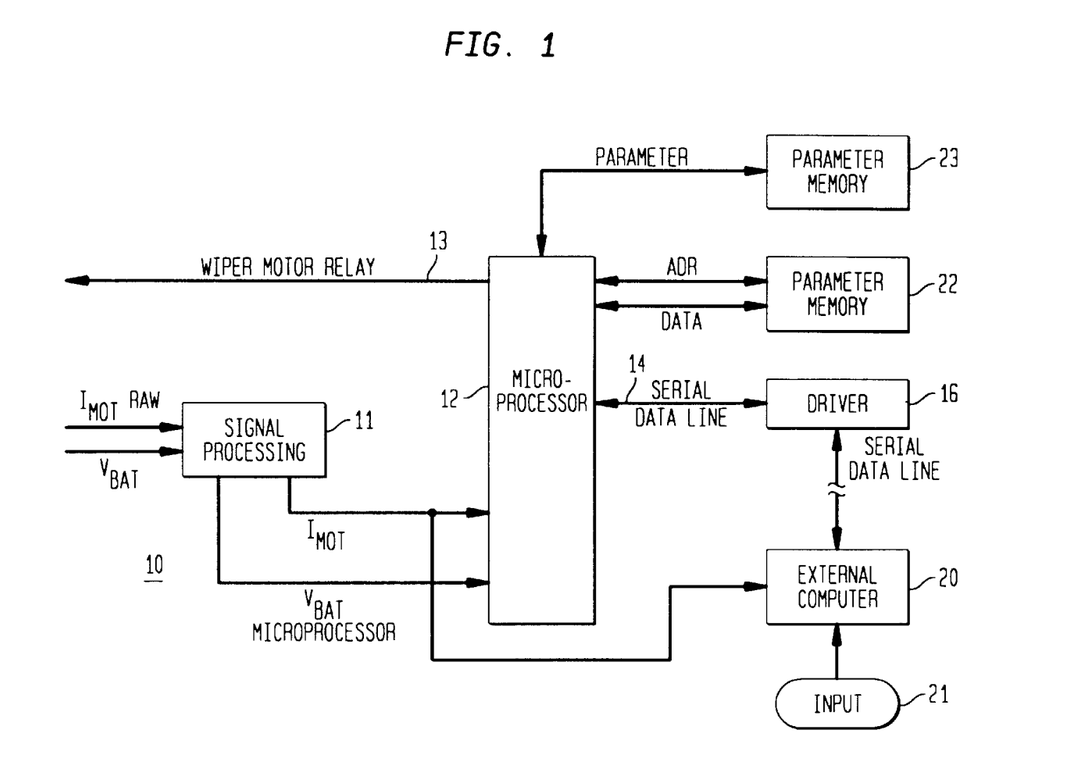
FIG. 1 is a simplified function block representation of certain hardware components that are useful in the implementation of a specific illustrative embodiment of the invention.

FIG. 1 is a simplified function block representation of certain hardware components that are useful in the implementation of a specific illustrative embodiment of the invention. As shown, a controller arrangement 10 has a signal processor 11 that is coupled at its output to a microprocessor 12. The signal processor receives at a first input thereof an unprocessed signal, $I_{mot}$ Raw, which is responsive to the motor (not shown) current of a windshield wiper arrangement (not shown). In addition, the signal processor receive a supply voltage $V_{bat}$ which, in this embodiment, is approximately 13 volts obtained from the vehicle electrical system (not shown).

In this specific illustrative embodiment of the invention, signal processor 11 provides a microprocessor voltage output, $V_{bat}$ Microprocessor, which in this embodiment is about 3 volts to supply operating power to microprocessor 12. The microprocessor is an 8 bit microcontroller with a built-in serial interface. As will be discussed herein, upon completion of the computation of an interval, the microprocessor will initiate a windshield wiper wipe cycle by placing an appropriate initiation pulse on its output 13.

Microprocessor 13 has an additional input/output port 14, which in this embodiment is a serial port. The information supplied by the microprocessor via input/output port 14 is propagated to a driver 16 which is coupled to and external computer 20 via a serial data connection. The serial data connection are enabled to transmit handshake signals required by the protocol under which the system operates, as well as data. Operation of the external computer is achieved via a user input 21, which may be a keyboard, voice command interface, or any other known input arrangement that permits use of conventional software programs, such as MICROSOFT Excel.

Programming instructions for the microprocessor are stored in a program memory 22 which is coupled to microprocessor 12 via respective data (DATA) and address (ADR) interfaces. In some embodiments of the invention, the ADR and DATA interfaces are on a bus (not shown). The various parameters that are employed in the practice of the invention, as will be discussed hereinbelow, are stored in a parameter memory 23. These parameters are responsive to certain characteristics of a particular vehicle (not shown), and are received via driver 16 from external computer 20. In a specific illustrative embodiment of the invention, the external computer is a laptop or other portable computer that can be transported in the vehicle to obtain the characteristic information from which the parameters are derived.

Figure 2:
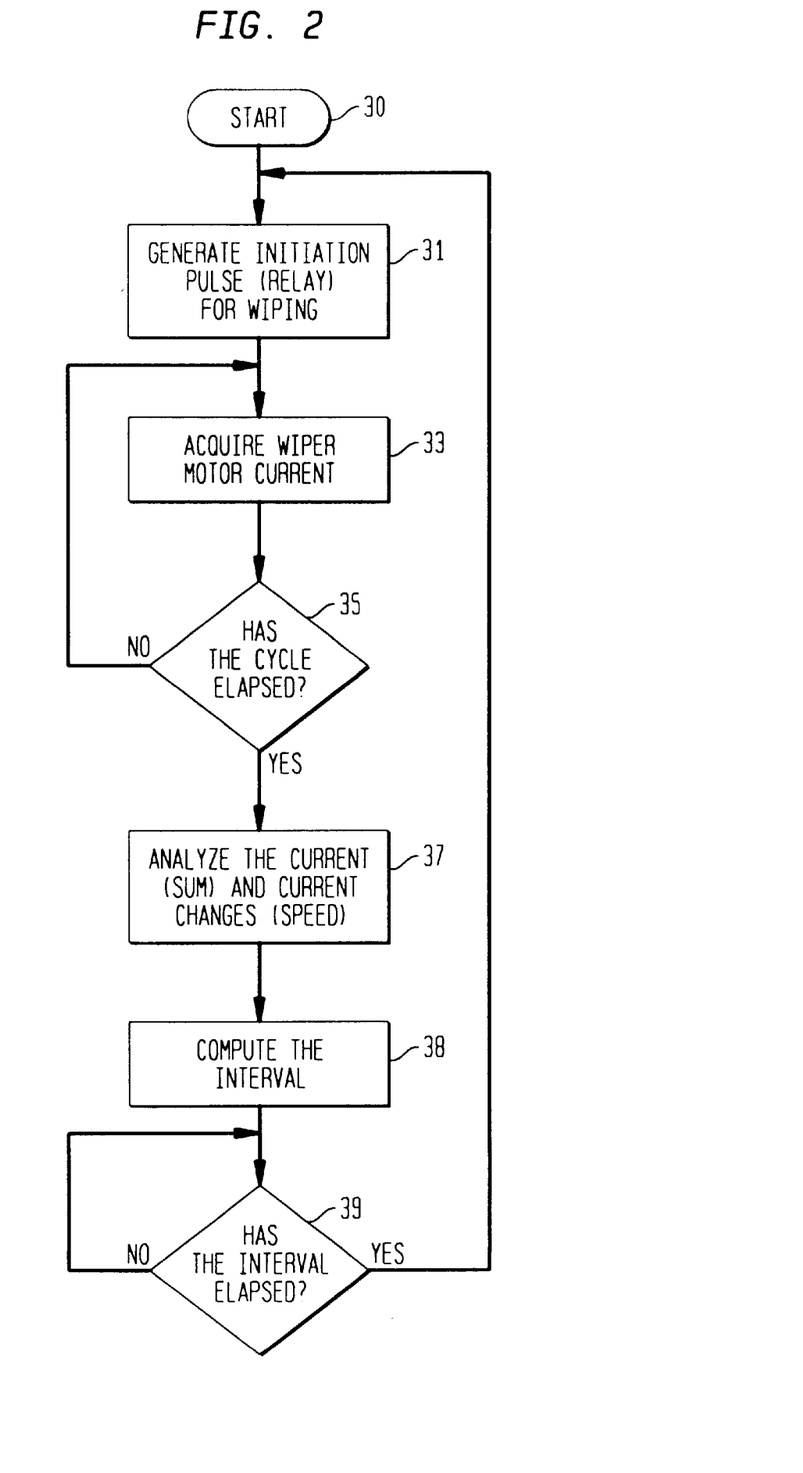
FIG. 2 is a simplified flow diagram that is useful in describing the general sequence of operation of the windshield wiper wipe cycle interval controller of the present invention.

FIG. 2 is a simplified flow diagram that is useful in describing the general sequence of operation of the windshield wiper wipe cycle interval controller of the present invention. As shown in this figure, a windshield wiper wipe cycle is initiated upon actuation of an actuator (not shown), such as a switch, at START block 30. This causes an initiation pulse to be issued at block 31. The initiation pulse, which is issued at wiper motor relay output 13 of microprocessor 12 (FIG. 1), causes wiper motor current to begin to flow. A signal ($I_{mot}$ Raw) responsive to the wiper motor current is acquired at function block 33, the signal being received at the referenced input of signal processor 11 (FIG. 1) and converted thereby to a digital signal suitable for inputting to the microprocessor.

At decision function block 35, the question is raised whether the windshield wiper wipe cycle has been completed. If the cycle has not completed, the process returns to continue acquisition and storage of the wiper motor current data. Once all of the wiper motor current information has been acquired and stored throughout the course of the windshield wiper wipe cycle (i.e., the wiper cycle has elapsed), the process continues to function block 37 where integration values are computed, as are differences in the integration values for the forward and return portions of the windshield wiper wipe cycle.

Figure 3:
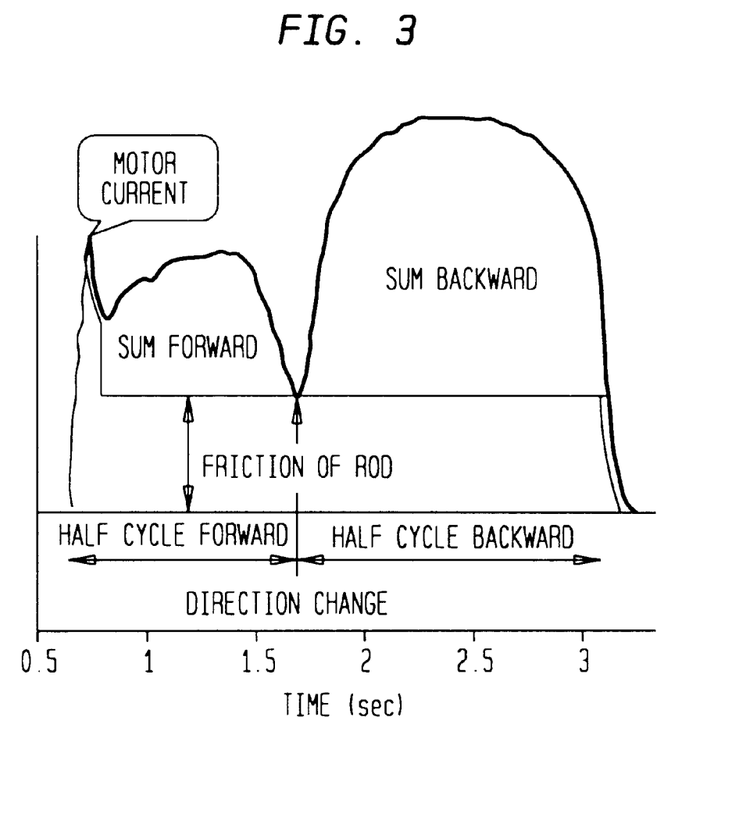
FIG. 3 is a graphical representation of the motor current during a windshield wiper wipe cycle, showing forward and return (backward) portions of the cycle.

Referring for the moment to FIG. 3, this figure is a graphical representation of the motor current during a windshield wiper wipe cycle, showing forward and return (backward) portions of the cycle. The figure illustrates that the wiper motor current varies over time and is characterized generally by an initial spike, followed by a lobe during the forward portion of the windshield wiper wipe cycle, and a second lobe during the return, or backward, portion of the wipe cycle. The point in time corresponding to the direction of change in the windshield wiper wipe cycle is identified in the figure, and it is noteworthy that the wiper motor current does not drop to zero at this point. The magnitude of the wiper motor current at this point corresponds to a systemic inefficiency, that may be viewed as resulting from mechanical friction in the windshield wiper linkages and rods. Thus, notwithstanding that the motion of the windshield wipers is zero at the point of reversal, a minimum amount of electrical energy is required to continue mechanical operation of the windshield wiper arrangement.

Figure 4:
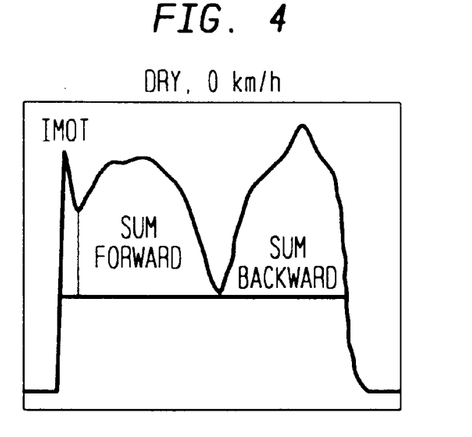
FIGS. 4 and 5 are graphical representations of the motor current during a windshield wiper wipe cycle, FIG. 4 showing a dry weather condition and FIG. 5 showing a wet weather condition, both at 0 km/h.
Figure 5:
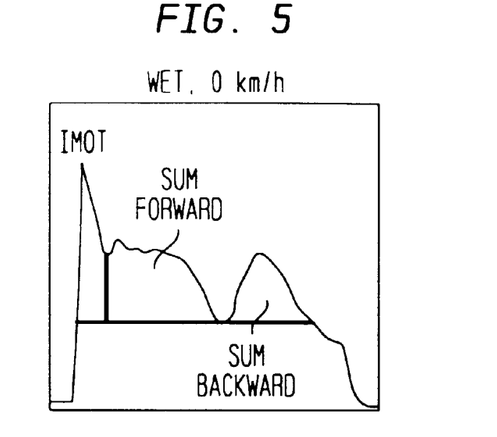

FIGS. 4 and 5 are graphical representations of the motor current during a windshield wiper wipe cycle, FIG. 4 showing a dry weather condition and FIG. 5 showing a wet weather condition, both at 0 km/h. As can readily be seen from these zero vehicle velocity situations, information relating to the wetness of the weather is reflected in the graphs. In FIG. 4, for example, the windshield is dry and therefore a considerable amount of current is drawn in both, the forward and backward directions of operation. In FIG. 5, however, the reduction in wiper friction that results from the water on the windscreen causes a significant reduction in the integration that are computed for the forward and backward directions of operation.

Figure 6:
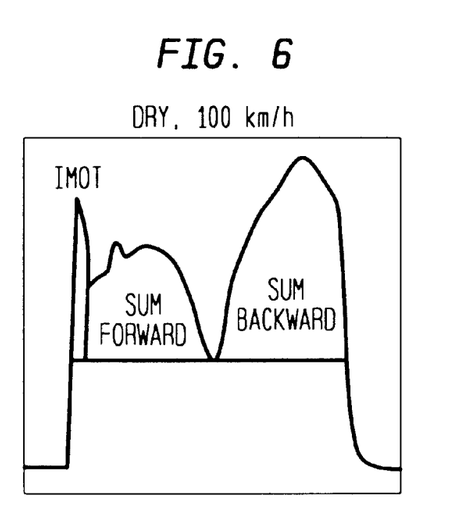
FIGS. 6 and 7 are graphical representations of the motor current during a windshield wiper wipe cycle, FIG. 6 showing a dry weather condition and FIG. 7 showing a wet weather condition, both at 100 km/h.
Figure 7:
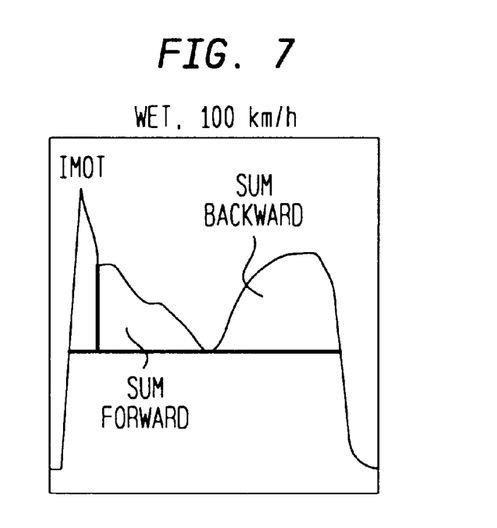

FIGS. 6 and 7 are graphical representations of the motor current during a windshield wiper wipe cycle, FIG. 6 showing a dry weather condition and FIG. 7 showing a wet weather condition, both at 100 km/h. These figures, therefore, illustrate the effect of vehicle air speed on the wiper motor current. FIG. 6 shows that during dry weather, more electrical energy is consumed in the backward portion of the windshield wiper wipe cycle due to the effects of the wind which increases the resistance encountered in that direction.

FIG. 7 shows the wet weather situation at 100 km/h. Looking at the forward sum lobe of the wiper motor current, the reduction in the wiper/windscreen friction resulting from the wetness of the weather is sufficient in this illustrative case to distort the shape, and reduce the amplitude, of the forward lobe. Evidently, the wind at 100 km/h in wet conditions helps urge the windshield wipers across the windshield. The sum, or integral over time, of the forward lobe is significantly reduced over the conditions represented in FIG. 6. As expected, backward lobe in FIG. 7 is considerably smaller than the corresponding lobe in FIG. 6. The difference between the sum of the forward lobe and the sum of the backward lobe therefore reflect the air speed of the vehicle.

Referring once again to FIG. 2, after the integration and air speed information is computed at function block 37, the process proceeds to a computation of the windshield wiper wipe cycle interval at function block 37. The system is queried at function block 39 to determine whether the interval established in function block 38 has expired. Upon expiration of the computer interval, the process returns to the initiation of a windshield wiper wipe cycle at function block 31.

Figure 8:
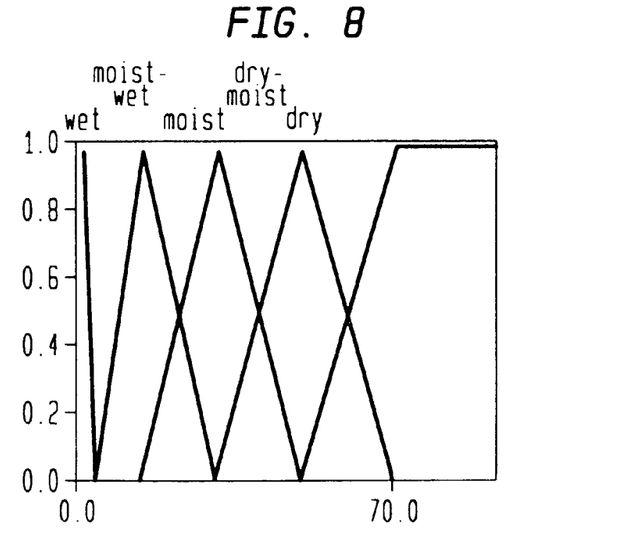
FIG. 8 is a graphical representation that is useful to explain the manner in which the sum over time, or integration value, of the motor current is classified, in this embodiment, into wet, moist-wet, moist, dry-moist, and dry classifications.

FIG. 8 is a graphical representation that is useful to explain the manner in which the sum of the motor current is classified, in this embodiment, into "wet," "moist-wet," "moist," "dry-moist," and "dry" classifications. These broadly defined categories are not, in this specific illustrative embodiment of the invention, quantified with specificity or numerical precision, but instead are indicative of broad ranges that will be modified, via the determination of parameters in accordance with the description below, to be adapted to specific vehicle types.

The essence of the foregoing can be represented as follows:

(a) Windscreen wet⇒little friction⇒little motor current⇒small SUM⇒small INTERVAL;

(b) Windscreen dry⇒great friction⇒great motor current⇒great SUM⇒great INTERVAL;

(c) 0 km/h⇒SumForward≈SumBackward⇒small SPEED⇒INTERVAL not shortened; and (d) 100 km/h⇒SumForward<<SumBackward⇒great SPEED⇒INTERVAL shortened.

Figure 9:
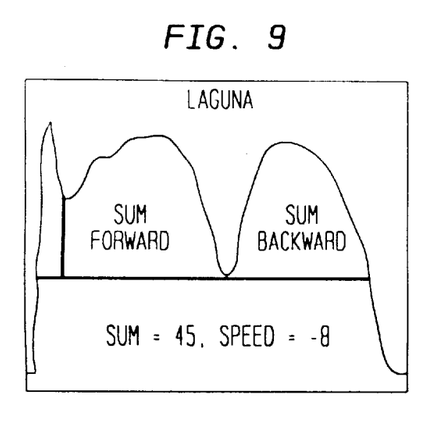
FIGS. 9 and 10 are graphical representations of the motor currents during respective windshield wiper wipe cycles of different vehicle types, FIG. 9 showing a motor current characteristic of a Renault Laguna automobile and FIG. 7 showing a motor current characteristic of a Ford Mondeo automobile.
Figure 10:
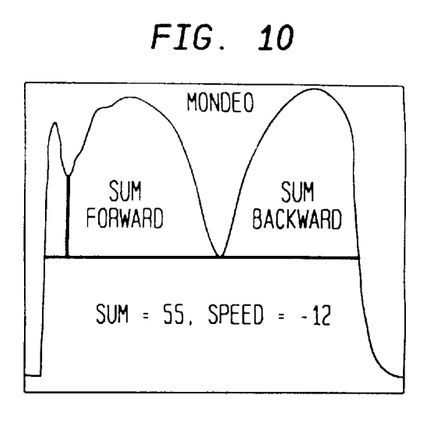

FIGS. 9 and 10 are graphical representations of the motor currents during respective windshield wiper wipe cycles of different vehicle types, FIG. 9 showing a motor current characteristic of a Renault Laguna automobile and FIG. 7 showing a motor current characteristic of a Ford Mondeo automobile. These figures illustrate that different vehicles will achieve different computational results for similar conditions.

Figure 11:
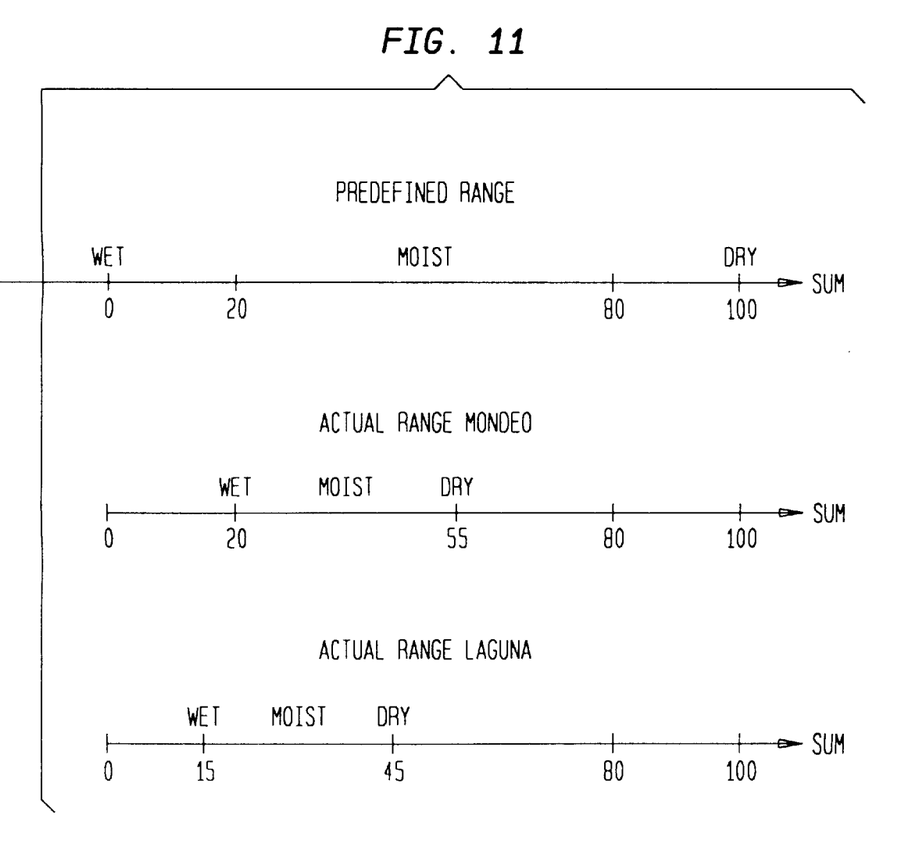
FIG. 11 is a graphical illustration of a normalized motor current summation range contrasted against normalized motor current integration range actually obtained from the Renault Laguna automobile and the Ford Mondeo automobile.

FIG. 11 is a graphical illustration of a normalized motor current integration range contrasted against normalized motor current integration range actually obtained from the Renault Laguna automobile and the Ford Mondeo automobile. This figure shows that a value of 45, for example, does not have the same meaning in the predefined range as it does for the actual range for the Laguna automobile or the actual range of the Mondeo automobile. Thus, in order to be able to employ the same control system for each of these vehicles, it is necessary to adjust the actual bounds using parameters that are obtained for each such vehicle. In the practice of this aspect of the invention, the parameters are derived empirically, by test-driving each vehicle type while collecting parametric information in an external computer, such as external computer 20 in FIG. 1, which in a specific illustrative embodiment of the invention, is a Pentium® laptop computer, 133 MHz processor, 40 Mb RAM, 2 Gb Hard Disc Drive. Persons of skill in the art can collect speed, wetness, and wiper motor current data, to configure a set of normalizing parameters that when applied to the controller invention herein would enable normalization of operating ranges for different vehicle types. The external computer/ microprocessor interface may be in the form of a conventional RS232 interconnection, and data assembled in a conventional spreadsheet program, such as MICROSOFT Excel.

It is recognized that the contour of the wiper motor current characteristic is affected by influences other than water. For example, wiper motor temperature will cause a variance in the quantity of current drawn. Correction for such variance can be achieved without the need for additional sensors, such as thermal sensors. For example, the controller arrangement can be configured to estimate motor temperature by recording motor ON time, or by making a resistance measurement. Additionally, variation in the base value of motor current attributed to the friction of the linkage rods (see, FIG. 3) can be correlated to motor temperature.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof

What is claimed is:

1. A method of controlling the interval between wiper wipe cycles of a windshield wiper arrangement for a vehicle, the method comprising the steps of:

initiating a windshield wiper wipe cycle;
   first measuring a current drawn by the windshield wiper arrangement during a first predetermined portion of the windshield wiper wipe cycle;
   first calculating a first integration value of the current over the first predetermined portion of the windshield wiper wipe cycle; and
   computing the interval between wiper wipe cycles in response to the first integration value.

2. The method of claim 1, wherein there is further provided the step of second calculating a second integration value of the current over a second predetermined portion of the windshield wiper wipe cycle, and said step of computing the interval between wiper wipe cycles is responsive to the first and second integration values.

3. The method of claim 2, wherein the first predetermined portion of the windshield wiper wipe cycle corresponds to a first interval of time during which the windshield wiper arrangement is operating in a forward wipe direction, and the second predetermined portion of the windshield wiper wipe cycle corresponds to a second interval of time during which the windshield wiper arrangement is operating in a return wipe direction.

4. The method of claim 3, wherein there is further provided the step of characterizing the windshield as wet when the first and second integration values are small.

5. The method of claim 4, wherein in said step of computing the interval there is further provided the step of establishing a short interval between wiper wipe cycles.

6. The method of claim 3, wherein there is further provided the step of characterizing the windshield as dry when the first and second integration values are large.

7. The method of claim 6, wherein in said step of computing the interval there is further provided the step of establishing a long interval between wiper wipe cycles.

8. The method of claim 3, wherein there is further provided the step of computing an air speed value of the vehicle during the windshield wiper wipe cycle in response to said first and second integration values of the current.

9. The method of claim 8, wherein said air speed value of the vehicle during the windshield wiper wipe cycle is responsive to a difference between said first and second integration values of the current.

10. The method of claim 8, wherein the interval established in said step of computing the interval is not changed when the air speed value is small.

11. The method of claim 8, wherein the interval established in said step of computing the interval is reduced in duration when the air speed value is large.

12. The method of claim 3, wherein there is further provided the step of first normalizing an overall integration value corresponding to the sum of the first and second integration values whereby the wetness of the windshield is established to be in one of a plurality of predetermined wetness states.

13. The method of claim 12, wherein the plurality of predetermined wetness states correspond to the states of wet, moist, and dry, respectively.

14. The method of claim 12, wherein there is further provided the step of second normalizing the overall integration value in response to parameters that are characteristic to a predetermined vehicle type.

15. The method of claim 14, wherein the predetermined vehicle type is a vehicle model.

16. A method of controlling the interval between wiper wipe cycles of a windshield wiper arrangement for a vehicle, the method comprising the steps of:

initiating a windshield wiper wipe cycle;
   first measuring a current drawn by the windshield wiper arrangement during a first predetermined portion of the windshield wiper wipe cycle corresponding to a forward direction of operation of the windshield wiper wipe cycle;
   second measuring a current drawn by the windshield wiper arrangement during a second predetermined portion of the windshield wiper wipe cycle corresponding to a return direction of operation of the windshield wiper wipe cycle;
   first calculating a first integration value of the current over the first predetermined portion of the windshield wiper wipe cycle;
   second calculating a second integration value of the current over the second predetermined portion of the windshield wiper wipe cycle; and
   computing a variation to an interval between wiper wipe cycles in response to a difference between the first and second integration values.

17. The method of claim 16, wherein prior to performing said step of computing the variation to the interval between wiper wipe cycles there is further provided the step of computing an overall integration value for the windshield wiper wipe cycle, the overall integration value being responsive to the first and second integration values.

18. The method of claim 17, wherein there is further provided the step of computing the interval between wiper wipe cycles in response to the overall integration value.

19. The method of claim 18, wherein a difference value corresponding to the difference between the first and second integration values is responsive to an air speed of the vehicle.

20. The method of claim 18, wherein said step of computing a variation to an interval between wiper wipe cycles comprises the further step of reducing the interval between wiper wipe cycles for large values of difference between the first and second integration values.

21. The method of claim 18, wherein said step of computing a variation to an interval between wiper wipe cycles comprises the further step of maintaining unchanged the interval between wiper wipe cycles for small values of difference between the first and second integration values.

22. The method of claim 17, wherein there is further provided the step of first normalizing the overall integration value corresponding to the sum of the first and second integration values whereby the wetness of the windshield is established to be in one of a plurality of predetermined wetness states.

23. The method of claim 22, wherein the plurality of predetermined wetness states correspond to the states of wet, moist, and dry, respectively.

24. The method of claim 22, wherein there is further provided the step of second normalizing the overall integration value in response to parameters that are characteristic to a predetermined vehicle type.

25. The method of claim 18, wherein the interval between wiper wipe cycles ranges in duration from 0 to about 20 seconds.

26. The method of claim 18, wherein there is further provided the step of first normalizing an overall integration value corresponding to the sum of the first and second integration values.

27. The method of claim 26, wherein there is further provided the step of collecting data empirically for formulating parameters corresponding to predetermined characteristics of the vehicle.

28. The method of claim 27, wherein there is further provided the step of second normalizing the overall integration value in response to the parameters, the parameters being characteristic to a predetermined vehicle type.

29. The method of claim 27, wherein there is provided the step of storing the data that is collected, in a data storage arrangement of a computer.

30. The method of claim 27, wherein the computer is configured to assemble the data in a spreadsheet format.

31. A system for controlling the interval between wiper wipe cycles of a windshield wiper arrangement for a vehicle, the system comprising:

a signal processor having an input for receiving a wiper motor current signal containing information relative to the quantity of current drawn by the windshield wiper arrangement, and an output for providing a digital wiper signal responsive to the wiper motor current signal; and a processor for computing in response to the digital wiper signal an integration value corresponding to an integration over time of the current drawn by the windshield wiper arrangement during consecutive forward and return cycles of the windshield wiper arrangement and for computing a windshield wiper wipe cycle interval responsive to the integration value, said processor having an output for producing a wipe cycle initiation signal responsive to the computed windshield wiper wipe cycle interval.

32. The system of claim 31, wherein there is further provided program memory means for storing data corresponding to the steps of:

initiating a windshield wiper wipe cycle;

first receiving data corresponding to a current drawn by the windshield wiper arrangement during a forward direction of the windshield wiper wipe cycle;

second receiving data corresponding to a current drawn by the windshield wiper arrangement during a second predetermined portion of the windshield wiper wipe cycle during a return direction of the windshield wiper wipe cycle;

first calculating a first integration value of the current over the first predetermined portion of the windshield wiper wipe cycle; and second calculating a second integration value of the current over the second predetermined portion of the windshield wiper wipe cycle.

33. The system of claim 31, wherein said processor is further provided with a computing arrangement for computing a variation to an interval between wipes in response to a difference between the first and second integration values.

34. The system of claim 31, wherein there is further provided a parameter memory for storing data corresponding to a characteristic of a particular vehicle type.

35. The system of claim 34, wherein said processor is further provided with a data input for receiving the data corresponding to a characteristic of a particular vehicle type and computing a variation to an interval between wiper wipe cycles in response to a difference between the first and second integration values.

36. The system of claim 34, wherein there is further provided an external computer means for communicating with said processor for establishing the data corresponding to a characteristic of a particular vehicle type.

37. The system of claim 36, wherein there is further provided a driver for effecting the communication between said processor and said external computer.

38. The system of claim 36, wherein there is further provided means in said external computer for defining parameter names stored in said parameter memory.

* * * * *